United States Patent [19]
Gaddy

[11] 3,823,382
[45] July 9, 1974

[54] SYSTEM FOR INHIBITING MOTOR VEHICLE OPERATION BY INEBRIATED DRIVERS

[76] Inventor: Amos L. Gaddy, 1534 Ridgewood Dr., Griffin, Ga. 30223

[22] Filed: June 22, 1973

[21] Appl. No.: 372,588

[52] U.S. Cl. .................... 340/53, 340/279, 180/99, 73/421.5 R
[51] Int. Cl. .......................................... G08b 21/00
[58] Field of Search ............ 340/52 R, 53, 237, 279; 180/99; 73/421.5 R; 307/10 R

[56] References Cited
UNITED STATES PATENTS

| | | | |
|---|---|---|---|
| 3,186,508 | 6/1965 | Lamont | 340/279 X |
| 3,780,311 | 12/1973 | Brown | 340/53 UX |

*Primary Examiner*—Alvin H. Waring
*Attorney, Agent, or Firm*—Newton, Hopkins & Ormsby

[57] ABSTRACT

A motor vehicle is equipped with a system for inhibiting operation by a drunk driver. A sample of the driver's breath is directed to a chamber containing chemical granules which react with alcohol fumes exothermally. A temperature responsive switch, which is in the form of a capillary tube partially filled with mercury and having electrodes at each end, extends through the chemical granules and is connected in a control circuit. The control circuit includes timers, alarms, and a relay for opening the ignition circuit of the vehicle. Upon actuation of the temperature responsive switch, an alarm and a timer are energized. After a predetermined time interval, the timer energizes a second alarm and a second timer. The second timer, after a predetermined time interval, energizes the relay to open the ignition circuit of the vehicle. Three such chambers are provided, each having a temperature responsive switch. A flow control valve directs the sample of the driver's breath to one of the chambers, and a selective switch is provided for connecting the temperature responsive switch in the selected chamber to the control circuit.

16 Claims, 4 Drawing Figures

3,823,382

SYSTEM FOR INHIBITING MOTOR VEHICLE OPERATION BY INEBRIATED DRIVERS

BACKGROUND OF THE INVENTION

This invention relates to a system for inhibiting motor vehicle operation by drunk drivers and, more particularly, to a system of this character which is responsive to a sample of the driver's breath.

The large number of automobile accidents and fatalities attributable to drivers under the influence of alcohol has led to a number of proposals for preventing or inhibiting the operation of a motor vehicle by an inebriated driver. In a number of systems of this character, it is proposed to detect the effect of alcohol on the driver. For example, in U.S. Pat. No. 3,665,447, the flicker fusion frequency phenomenon is used to identify the inebriate and automatically prevent him from operating the vehicle. The individual is exposed to a light source which randomly changes between an illumination which appears flashing to the sober individual and an illumination which appears steady. Since the drunk driver cannot make this distinction, it is possible to identify him and prevent him from operating the vehicle. In U.S. Pat. No. 3,610,943, a system is proposed in which a random number is displayed, and the driver must enter this random number in a keyboard. Since this is beyond the ability of the inebriated driver, he cannot complete the test and thus cannot start the car. Systems of this character tend to be complex, and, by testing a secondary characteristic of the drunk driver, do not monitor the level of alcohol directly.

However, it has been proposed in U.S. Pat. No. 3,186,508 to introduce a sample of the driver's breath to a solution which is partially bleached by alcohol. A photoelectric cell and a lamp are provided so that this change in the optical properties of the solution may be detected and used for preventing operation of the vehicle by a drunk driver. However, this prior art system is unduly complex and is subject to problems related to the necessity to frequently change the solution before the vehicle can be started by a sober driver.

It has also been proposed in the prior art to test the breath of a driver after it is suspected that he has been driving while drunk. In accordance with this proposal, a sample of the driver's breath is introduced into an ampule containing chemical granules which change color when subjected to alcohol fumes. Color change detectors of this character, however, are ineffective to prevent operation of the vehicle by the drunk driver, serving only to detect the level of alcohol in his breath after the event.

SUMMARY OF THE INVENTION

It is accordingly the principal object of the present invention to provide an improved system for inhibiting the operation of a motor vehicle by a drunk driver. More particularly, it is an object of the invention to provide an effective system of this character which is relatively simple and economical.

To this end, the system of the present invention makes use of the discovery that alcohol breath detectors of the color change type react exothermally when exposed to alcohol fumes. This property of the chemical reaction in such detectors is exploited in the present invention by providing temperature responsive switch means in association with the chemical means provided in a chamber which receives a sample of the breath of the driver. When a sample of the breath of the driver is introduced into the chamber, any alcoholic fumes within the sample react with the chemical reagent within the chamber. Since this reaction is exothermal, heat will be generated. This heat is detected by a temperature responsive switch in the form of a capillary tube partially filled with mercury and having electrodes at both ends. If a sufficient amount of heat is provided by the reaction, the mercury column moves up the capillary tube until it bridges the gap between the two electrodes, closing a circuit. The temperature responsive switch is connected in a control circuit and serves to energize an alarm and timing means in response to actuation of the temperature responsive switch. After a predetermined time interval, the timing means actuates a second alarm and initiates the operation of a second timing means. The second timing means after a predetermined time interval serves to actuate a relay which opens the ignition circuit of the motor vehicle effectively preventing operation of the motor vehicle by an inebriated driver.

Since it is desirable that the driver, or another driver, may be given the opportunity to attempt to drive the motor vehicle at a later time, more than one chamber is provided and a temperature responsive switch is provided in each chamber. In order to direct a sample of the driver's breath selectively to a chamber, a control valve is provided. The switch within the selected chamber is connected by a selective switch to the control circuit, the selective switch being ganged to the control lever of the control valve.

These and other objects, features, and advantages of the invention will become more readily apparent from the following detailed description of a preferred embodiment and with reference to the accompanying drawings.

DETAILED DESCRIPTION OF THE PREFERRED EMBODIMENT

Figure 1:
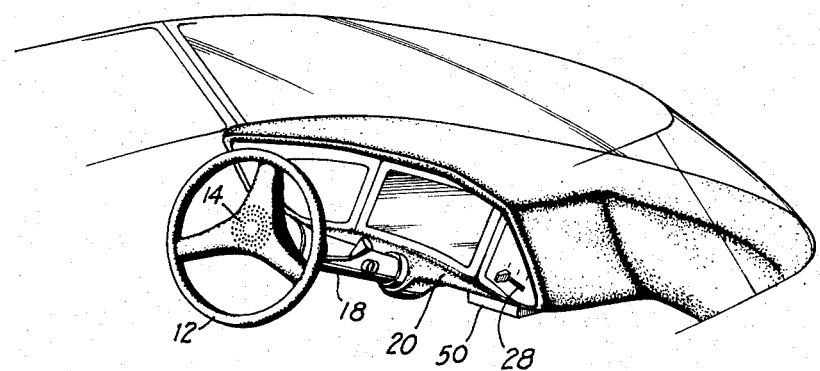
FIG. 1 is a partial perspective view of an interior of a motor vehicle equipped with an embodiment of the present invention.

Referring to FIG. 1, it will be seen that a motor vehicle 10, having a steering wheel for receiving a sample of the driver's breath. This sample is conducted through vent hose 16 extending from vent holes 14 coaxially through steering wheel column 18. Flexible vent hose 16 extends through dashboard 20, and, as will be presently described, is connected to flow control means 28 which is shown positioned at the right side of the dashboard. Just below flow control means 28 is the alcohol detection unit 50 which is removably connected thereto by means to be presently described.

Figure 2:
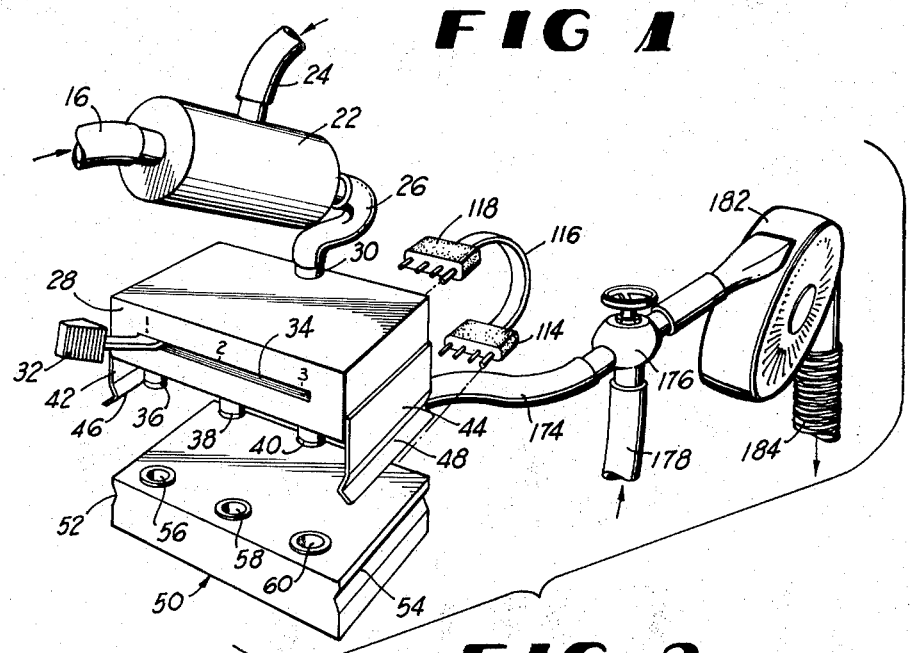
FIG. 2 is a partially exploded view, in perspective, of features of the preferred embodiment.

Turning next to FIG. 2, it will be seen that vent hose 16 is connected to a temperature control unit 22 which is coupled by means of a hose 24 to a temperature controlled heater such as a "Climatizer" of the type found in a Cadillac. Air is pulled from temperature control unit 22 by a blower 182 and flows through a hose 26 to flow control unit 28, entering flow control unit 28 through a fitting 30. Flow control unit 28 is provided with a control lever 32 having three positions designated as "1", "2", and "3" along a slot 34 in the front wall of the unit. Control lever 32 serves to operate a valve (not seen) within valve control unit 28 for coupling inlet fitting 30 to one of three outlet fittings 36, 38, and 40 corresponding, respectively, to positions 1, 2, and 3 of control lever 32.

A pair of spring arms 42 and 44 depend from opposite ends of flow control unit 28 and serve to retain alcohol detection unit 50 thereunder. For this purpose, spring arm 42 is provided with a V-shaped deformation 46, and spring arm 44 is provided with a V-shaped deformation 48. These V-shaped deformations are adapted to cooperate with respective V-grooves 52 and 54 on opposite ends of the housing of alcohol detection unit 50. Since the length of the housing of alcohol detection unit 50 is equal to the spacing between spring arms 42 and 44, and since V-shaped deformations 46 and 48 extend inwardly, it will be readily appreciated that alcohol detection unit 50 may be moved upwardly beneath flow control unit 28 until V-shaped deformations 46 and 48 snap into grooves 52 and 54 respectively to detain alcohol detection unit 50 therebetween.

When alcohol detection unit 50 is so positioned beneath flow control unit 28, outlet fittings 36, 38, and 40 of flow control unit 28 fit within inlet fittings 56, 58, and 60, respectively extending upwardly from the top wall of alcohol detection unit 50. In this way, the valve within flow control unit 28 serves to control which of inlet openings 56, 58, and 60 will receive the sample of the driver's breath received through vent holes 14 in steering wheel 12.

Figure 3:
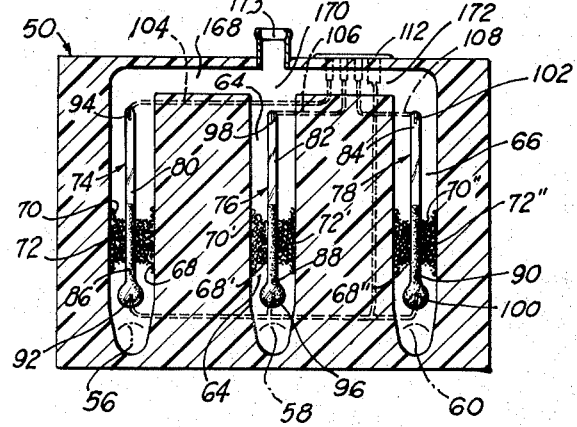
FIG. 3 is a top plan cross-sectional view of the alcohol detection unit of the invention.

The alcohol control unit 50 will be best understood from the section view of FIG. 3. As shown in this view, inlet fitting 56 communicates with a chamber 62, inlet fitting 58 communicates with a chamber 64, and inlet fitting 60 communicates with a chamber 66. Within chamber 62 a pair of screens 68 and 70 define a space therebetween within which is positioned chemical granules 72 which serve as a chemical reagent for reacting with alcohol fumes received in the sample from the driver. Chemical granules 72 are of the type normally used within alcohol fume detectors of the color change type. It has been discovered that the chemical reaction accompanying the color change in devices of this character is exothermal. By detecting the release of heat associated with the chemical reaction with alcohol, the presence of alcohol is detected. In particular, the chemical particles 72 may be of the type disclosed in U.S. Pat. No. 3,455,654 which discloses a color change detector in which the reagent is normally yellow, changing from its normal yellow color to green in the presence of alcohol. A hexavalent chromium compound is employed as the reagent and may, as disclosed in U.S. Pat. No. 3,455,654, be supplied as chromium trioxide or as a soluble chromate or dichromate, e.g., potassium (or other alkali metal) chromate or dichromate. Phosphoric acid is provided as othophosphoric acid or metaphosphoric acid or other acids of pentavalent phosphorous. In addition, a carrier in the form of a granular absorbent which serves as an inert physical carrier for the reagent is employed. The chemical substances used in the color change alcohol detector shown in U.S. Pat. No. 3,459,508 also may be used and include a reagent such as permanganate or chromatosulphuric acid in granular form, which also exhibits an exothermal reaction in the presence of alcohol. Another alcohol detecting color change reagent which is useful in the present invention because of an exothermal reaction with alcohol is the reagent disclosed in U.S. Pat. No. Re27,008. This patent discloses a reagent which is a mixture of a chromate-ion producing substance and sulphuric acid. Suitable chromate-ion substances mentioned are sodium dichromate, ammonium dichromate, and chromic acid. Chamber 64 is similarly provided with a pair of screens 68' and 70' defining a space within which is confined similar chemical granules 72' which will also exhibit an exothermal reaction in the presence of alcohol. By the same token, chamber 66 is provided with a pair of screens 68" and 70" between which are confined chemical granules 72" of the same type employed in chambers 62 and 64. These granules will also exhibit an exothermal reaction when reacting with alcohol fumes.

In order to detect the exothermal reaction which signifies the presence of alcohol fumes, each of the chambers is provided with a temperature responsive switch. Thus, in chamber 62, a temperature responsive switch 74 is positioned axially of the chamber and extends through screens 70 and 72 and, in particular, through chemical granules 72. It will be noted that temperature responsive switch 74 is formed by a capillary tube 80 which is partially filled with mercury 86 and is provided with electrodes 92 and 94 at opposite ends of the tube. Thus, when an exothermal reaction occurs within chemical granules 72, the heat generated thereby causes expansion of the mercury column 86 until the column bridges the gap at the upper end of tube 80 and reaches electrode 94. At this time, a circuit through temperature responsive switch 74 is effectively closed. Since capillary tube 80 is of the type commonly found in clinical thermometers, the mercury column will be retained within capillary tube 80, maintaining the circuit between electrodes 92 and 94 closed even after the supply of heat from the exothermal chemical reaction has ended. In this way, it will not be possible for a drunk driver to circumvent the operation of temperature responsive switch 74 by again attempting to operate the automotive vehicle after all of the chemical reagent has been consumed by the exothermal reaction.

Similar temperature responsive switches are found in the other chambers. Thus, in chamber 64, temperature responsive switch 76 extends axially thereof through screens 68' and 70' and through chemical granules 72'. Temperature responsive switch 76 also comprises a capillary tube 82 and also contains a column of mercury 88. Here, again, the exothermal reaction will cause expansion of the mercury column until it bridges the gap between a pair of electrodes 96 and 98 at opposite ends of the capillary tube. This tube also will maintain the expanded mercury column even after the source of heat has been removed, thus maintaining the circuit closed through temperature responsive switch 76. Exactly the same arrangement is found in chamber 66. A temperature responsive switch 78 is located axially of the chamber and includes a capillary tube 84 filled partially with a column of mercury 90. Heat generated in response to the exothermal reaction of chemical granules 72" with alcohol fumes will cause expansion of the mercury column until it bridges the gap between a pair of electrodes 100 and 102 at opposite ends of capillary tube 84. Here, also, the capillary tube is of the type which will retain the mercury column in expanded position even after removal of the source of heat. Thus, the temperature responsive switch 78 will be maintained in its closed position even after the exothermal reaction has been completed.

Temperature responsive switches 74, 76 and 78 are connected through a socket connector 112 to a control circuit which will be presently described. For this purpose, a wire 104 connects electrode 94 of the temperature responsive switch 74 to a terminal of socket 112, a wire 106 connects electrode 98 of temperature responsive switch 76 to a terminal of socket 112, and a wire 108 connects electrode 102 of temperature responsive switch 78 to a terminal of socket 112. A common wire 110 is connected to electrode 92 of temperature responsive switch 74, electrode 96 of temperature responsive switch 76, and electrode 100 of temperature responsive switch 78, connecting these electrodes to a fourth terminal of socket 112.

A plug connector 114 is connected to socket connector 112 and, through a cable 116 and a second plug connector 118 at the other end of the cable, makes connection to a socket connector 120 (see FIG. 4) on the rear of the housing of flow control unit 28. Socket connector 120 has four terminals connected, respectively, to wires 122, 124, 126 and 128. It will be noted that wire 122 is connected to common wire 110, that wire 124 is connected to wire 104, that wire 126 is connected to wire 106, and that wire 128 is connected to wire 108. A selective switch 130 is provided and has three contacts, which are respectively connected to wires 124, 126, and 128, and a moving contact 132. When contact 132 is in position 1 corresponding to position 1 of flow control lever 32, conductor 124, conductor 104, electrode 94, and temperature responsive switch 74 are connected to moving contact 132. When moving contact 132 is in position 2 corresponding to position 2 of flow control lever 32, it is connected to conductor 126, conductor 106, electrode 98, and temperature responsive switch 76. By the same token, when moving contact 132 is in position 3 corresponding to position 3 of flow control lever 32, moving contact 132 is connected to conductor 128, conductor 108, electrode 100, and temperature responsive switch 78. In order to automatically move selective switch 130 to the proper position, there is a ganged connection 134 between moving contact 132 of switch 130 and flow control lever 132. Thus, when flow control lever 132 is in position 1 directing the flow of the sample of the driver's breath to chamber 62, only temperature responsive switch 74 is connected to moving contact 132. When flow control lever 32 is in position 2 directing the flow of the sample of the driver's breath to chamber 64, only temperature responsive switch 76 is connected to moving contact 132 of selective switch 130. In the same manner, when flow control lever 32 is in position 3 directing the flow of the sample of the driver's breath to chamber 66, only temperature responsive switch 78 is connected to the moving contact 132 of selective switch 130.

Figure 4:
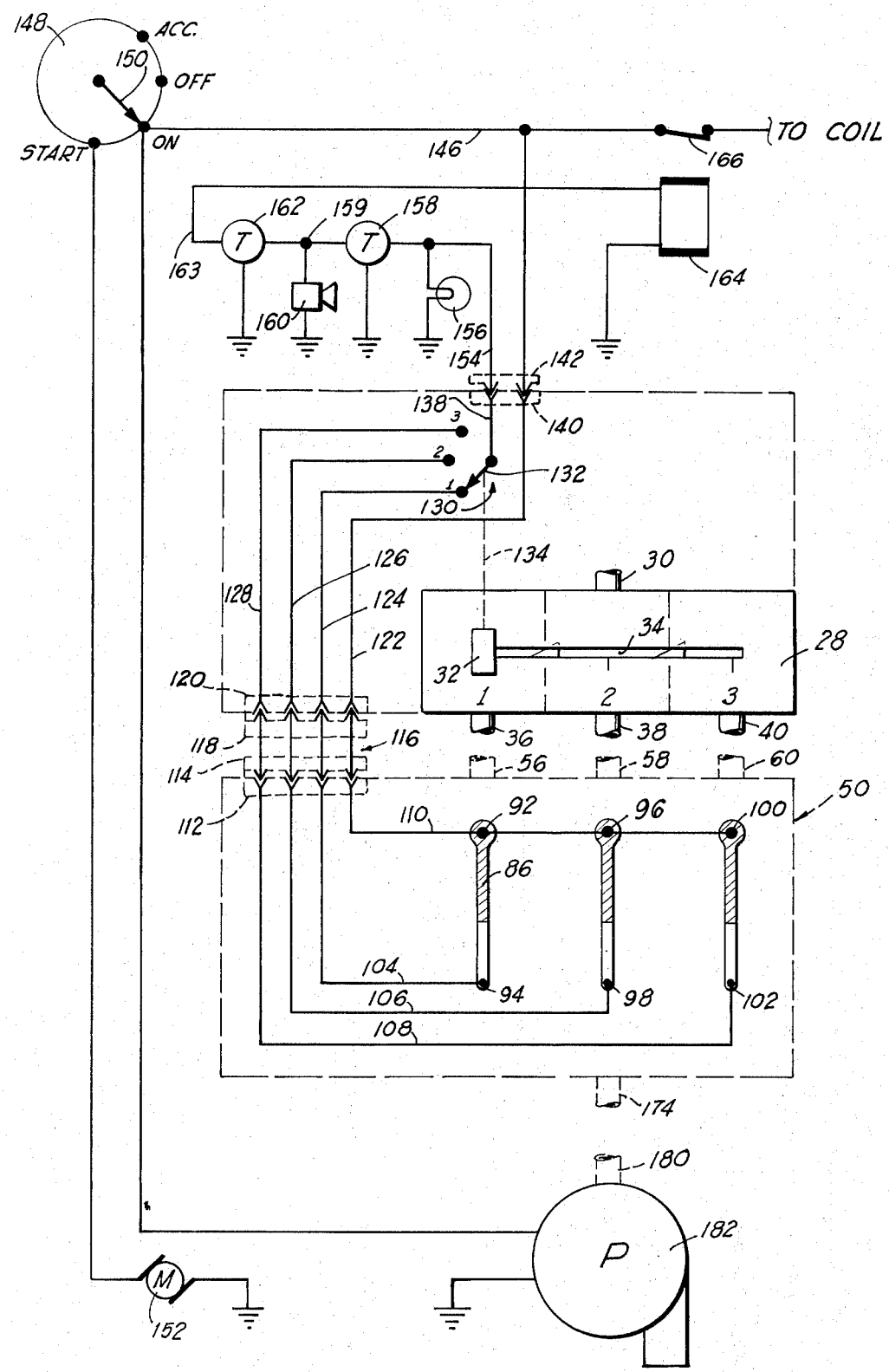
FIG. 4 is a schematic diagram showing the electric circuit of the preferred embodiment as associated with the ignition circuit of a motor vehicle.

A conductive lead 138 connects moving contact 132 of selective switch 130 to a terminal of a socket connector 140 provided on the housing of flow control unit 28. Conductive lead 122 which, as described above, is connected through socket 120, plug 118, cable 116, plug 114, and socket 112 to common conductive lead 110, is connected to the other terminal of socket connector 140. A plug connector 142 is interengaged with socket connector 140, connecting a conductor 144 to conductor 122 and a conductor 154 to conductor 138. Conductor 144 is connected to a lead 146 from ignition switch 148 of the motor vehicle. Ignition switch 148 is of the type commonly found in motor vehicles, and includes a key operated moving contact 150 which has a number of positions. Moving contact 150 is connected to the battery (not shown) of the motor vehicle and connects direct current power from the battery to a number of contacts. When in the ON position as shown in FIG. 4, battery power is connected to lead 146, and through lead 146 to the ignition coil of the vehicle. Other typical positions of ignition switch 148 are ACC. for energizing accessory circuits, OFF which is a position in which power from the battery is disconnected, and START which is a position in which power from the battery is connected to a starting motor 152.

Considering the position of contact 132 of selective switch 130 as shown in FIG. 4, it will be seen that heat generated by an exothermal reaction of reagent 72 with alcohol fumes will result in expansion of column 86 until a circuit is completed between electrodes 92 and 94. This will complete a circuit from the ON position of starter switch 148, connecting battery power through lead 146, lead 144, lead 122, lead 110, electrode 92, mercury column 86, electrode 94, lead 104, lead 124, contact 1 of selective switch 130, and movable contact 132 of selective switch 130 to lead 154. The presence of direct current voltage on lead 154 will cause the energization of an alarm or warning lamp 156 signifying the closure of temperature responsive switch 74 in response to alcohol fumes in the driver's breath. At the same time, the voltage from lead 154 is applied to a timer 158 initiating operation of this timer. It will be understood that timer 158 comprises a small motor which drives a contact closing a circuit at the end of a predetermined time interval. The closed circuit will result in the application of the voltage from lead 154 to a terminal 159. This will result in energization of a horn or buzzer 160 serving as a second alarm signifying that temperature responsive switch 74 has closed in response to the presence of alcohol in the driver's breath. Voltage at 159 will also initiate operation of a second timer 162. This timer will also comprise a small timer motor energized by the voltage at 159 and driving a contact to close a circuit after a second predetermined time interval. When this circuit is closed, the voltage from terminal 159 will be applied through timer 162 to lead 163, thereby applying voltage from the battery to a relay coil 164. Relay coil 164 controls a relay contact 166 in conductor lead 146 to the ignition coil of the motor vehicle. Actuation of relay 164 results in the opening of switch 166 and thus in the opening of the ignition circuit of the vehicle, effectively preventing operation of the vehicle by the inebriated driver. The timers 152 and 158 in this circuit will automatically reset upon removal of the source of current along with the relay switch 166 which will return to a normally closed position upon selection of a new position of the selector lever 32.

As discussed above, mercury column 86 will, because of the geometry of capillary tube 80, be retained in its expanded position once it has been subjected to heat and expanded to bridge the gap between electrodes 92 and 94. Thus, if, at some later time, it is desired to start the motor vehicle, it will not be possible so long as flow control lever 32 is in position 1. At this time, the operator of the motor vehicle will move flow control lever 32 to position 2, bringing, also, selector switch 130 to position 2. As a result, temperature responsive switch 76 will be connected through switch 130 to the control circuit. The sequence of events will be the same, alarm lamp 156 first being energized in response to closure of temperature responsive switch 76, and energization of timer 158 will be initiated by such closure. After a predetermined time interval, as already described, buzzer 160 will be energized, and second timer 162 will be energized to establish the second time interval. After the second time interval, relay 164 will again be energized to open switch contact 166 again interrupting the ignition circuit of the motor vehicle. In the same way, should both temperature responsive switch 74 and temperature responsive switch 76 be held in their closed position by retention of the mercury column 86 or 88 between the respective electrodes of the temperature responsive switch, the operator will move flow control lever 32 to position 3, bringing selector switch 130 to position 3. If again, alcohol fumes cause expansion of mercury column 90 to bridge the gap between electrodes 100 and 102, the sequence of events will be as previously described until actuation of relay coil 164 causes the opening of switch 166 to open the ignition circuit of the motor vehicle.

As will be noted from FIG. 3, chamber 62 is connected to an outlet duct 168, chamber 64 is connected to an outlet duct 170, and chamber 66 is connected to an outlet duct 172, these outlet ducts being located at the opposite end of chambers 62, 64, and 66, from the connection to inlet openings 56, 58, and 60, respectively. Ducts 168, 170, and 172 all lead to a common outlet fitting 173 which, as shown in FIGS. 2 and 4, is connected to an outlet hose 174. Outlet hose 174 is connected through a valve 176. Valve 176 serves to regulate the flow from a vent hose 178 drawing additional air in from the passenger compartment. From the outlet side of valve 176 a hose 180 is coupled to a blower 182. As seen in FIG. 4, blower 182 is energized when switch 148 is in the ON position. The air drawn by blower 182 is returned to the passenger compartment through a hose 184. Thus, energization of blower 182 serves to draw a sample of the driver's breath through vent holes 14, vent hose 16, temperature control unit 22, hose 26, flow control unit 28, alcohol detection unit 50, outlet hose 174, valve 176, hose 180, and hose 184.

The operation of the preferred embodiment will be readily apparent from the foregoing.

When a driver enters the car and turns the ignition key switch 148 to the ON position, blower 182 will be energized and air will be drawn through intake manifold 14 and hose 178. With the driver seated in front of steering wheel 12, a sample of his breath will be drawn through intake manifold vent holes 14 and be directed through vent hose 16, temperature control unit 22, and hose 26 to flow control unit 28. With control lever 32 in position 1, the valve within flow control unit 28 will direct the sample of the driver's breath to chamber 62. This sample will be drawn from chamber 62 through duct 168, outlet 173, hose 174, valve 176, and hose 180 to blower 182. It will be noted that, to begin with, warning lamp 156, warning buzzer 160, timers 158 and 162, and relay 164 are unenergized and relay switch 166 is in its closed position. If the sample of the driver's breath contains alcohol fumes, a chemical reaction will ensue with the chemical reagent contained in chemical granules 72 within chamber 62. The exothermal action will generate heat, causing mercury column 86 to expand until it reaches electrode 92. At this time, temperature responsive switch 74 will be closed, and a circuit will be completed between conductors 110 and 104 on opposite sides of the switch. Since selector switch 130 is in position 1 with movable contact 132 connected to conductor 124 when control lever 32 is in position 1 of flow control unit 28, the closure of temperature responsive switch 74 will result in the application of direct current from the battery through switch 148, conductor 146, conductor 144, conductor 122, conductor 110, temperature responsive switch 74, conductor 104, conductor 124, selector switch 130, and conductor 154 to the alarm or warning lamp 156 which is thus energized. Direct current from the battery is also applied from conductor 154 to timer 158 initiating a timing sequence of this timer. After a predetermined time interval, the timer will complete a circuit from conductor 154 to alarm or warning buzzer 160 and will initiate operation of the second timer 162. After a second predetermined time interval, timer 162 will complete a circuit from conductor 154 through timer 158 to a conductor 163 which is connected to relay coil 164. This will cause energization of relay coil 164, which will open relay switch 166 thus interrupting the application of direct current voltage from the battery to the ignition coil of the vehicle. This will effectively prevent further operation of the motor vehicle.

Since capillary tube 80 is of the type which will retain the expanded mercury column 86 after it has expanded to bridge the gap between electrodes 92 and 94, further attempts to start the car will not be successful so long as control lever 32 is in position 1. The driver, however, can then shift control lever 32 to position 2 and attempt to start the car again. If the sample of his breath drawn in through vent holes 14 of the intake manifold still contain a level of alcohol fumes sufficient to cause an exothermal reaction within the chemical granules 72' in chamber 64, the second temperature responsive switch 76 will be closed when mercury column 88 expands until it bridges the gap between electrodes 96 and 98. The sequence of actuation of warning lamp 156, timer 158, warning buzzer 160, timer 162, and relay coil 164 will be repeated until the opening of switch 166 again opens the ignition circuit of the motor vehicle preventing operation thereof. Since capillary tube 82 of temperature responsive switch 76 will also retain mercury column 88 in position to bridge the gap between electrodes 96 and 98, temperature responsive switch 76 will also be maintained in its closed position. Thus, any further attempts to drive the car with selector lever 32 in position 2 will not be successful. The driver may, however, move selector lever 32 to position 3, thus connecting temperature responsive switch 78 in the control circuit to selector switch 130 with movable contact 132 moved to position 3. The sample of the driver's breath will be directed by the valve in flow control unit 28 through chamber 66. If alcohol fumes are present in the driver's breath, a chemical reaction will take place with chemical granules 72''. The exothermal reaction will release heat, and this heat will cause expansion of mercury column 90. When the column of mercury bridges the gap between electrodes 100 and 102, temperature responsive switch 78 will be closed. This will cause a repetition of the cycle previously described, causing actuation of warning lamp 156, timer 158, warning buzzer 160, and the second timer 162 until relay 164 is energized to open switch 166 and thus open the ignition circuit of the motor vehicle. This again will prevent operation of the motor vehicle by an inebriated driver.

In the event that all three temperature responsive switch units 74, 76, and 78 have been exposed to the exothermal reaction and thus have mercury columns in the closed position of the switch, it is possible to replace alcohol detection 50. This may be done by disconnecting plug 114 from socket 112 and by releasing spring arms 42 and 44 to drop the unit 50 from beneath flow control unit 28. Hose 174 will then be disconnected from fitting 173, and a new alcohol detection unit 50 may be connected to hose 174 and snapped into place between spring arms 42 and 44. Plug 114 will then again be connected to socket 112. Control arm 32 will then be moved to position 1, and three more attempts at starting the automobile will be possible.

Modifications in the above described structure may be implemented including the substitution of individually replaceable temperature responsive switch units for the temperature responsive switch units of the invention. In that event, each temperature responsive switch unit may be provided in an ampule having vent holes at each end. The unit will again have a pair of spaced screens holding a supply of the chemical reagent therebetween and a capillary tube will extend axially of the glass ampule. The ampule will, of course, have electrical leads at each end connected to the electrodes at each end of the capillary tube and these may be connected through suitable electric connectors to the circuitry of the system. Thus, in the just described embodiment individual temperature responsive switch units may be replaced.

It will also be understood that other structural arrangements may be employed using the elements of the above-described system. For example, the air drawn through hose 174 may be then directed through an air filter and heater system of the type normally found in an automotive vehicle. Different types of temperature responsive switch might be employed, including thermistors and the like. However, temperature responsive switches of this type do not readily retain their closed position after being exposed to heat. Thus, when temperature responsive switches of this character are employed, it will be necessary to provide additional means for maintaining the switch in closed position.

The invention claimed is:

1. In a system for inhibiting the operation of a motor vehicle by an inebriated driver, a switch assembly responsive to a predetermined level of alcohol in the breath of the driver, comprising:
   a. a chamber containing chemical means for reacting with alcohol fumes, said reaction being exothermal,
   b. temperature responsive switch means extending within said chamber in contact with said chemical means, said switch means being actuated in response to a predetermined temperature of said exothermal reaction; and,
   c. flow control means for introducing a sample of the driver's breath into said chamber.

2. In a system in accordance with claim 1, circuit control means for controlling the ignition circuit of said vehicle, said circuit control means opening said ignition circuit in response to actuation of said switch means.

3. In a system in accordance with claim 1, circuit control means for controlling alarm means, said circuit control means energizing said alarm means in response to actuation of said switch means.

4. In a system in accordance with claim 3, said circuit control means comprising timing means for opening the ignition circuit of said vehicle after a predetermined time interval, actuation of said switch means initiating operation of said timing means.

5. In a system in accordance with claim 3, said circuit control means comprising first timing means for energizing second alarm means after a predetermined time interval, actuation of said switch means initiating operation of said timing means, second timing means for opening the ignition circuit of said vehicle after a second predetermined time interval, said first timing means initiating operation of said second timing means after completion of said first predetermined time interval.

6. In a system in accordance with claim 1, circuit control means for controlling the ignition circuit of said vehicle, said control means including timing means for opening said ignition circuit after a predetermined time interval, actuation of said switch means initiating operation of said timing means.

7. In a system in accordance with claim 1, said flow control means comprising valve means for directing said sample of the driver's breath to said chamber.

8. In a system in accordance with claim 1, a plurality of said chambers and a plurality of said temperature responsive switch means respectively within each chamber, said flow control means comprising valve means for directing said sample to one of said chambers.

9. In a system in accordance with claim 8, selective switch means in series with each of said temperature responsive switch means, said selective switch means selecting one of said temperature responsive switch means for connection to circuit control means for controlling the ignition circuit of said vehicle.

10. In a system in accordance with claim 9, said selective switch means being ganged to said valve means, whereby said sample is directed to the chamber within which the temperature responsive switch means connected to said circuit control means by said selective switch means is located.

11. In a system in accordance with claim 10, said circuit control means opening said ignition circuit in response to actuation of said selected temperature responsive switch means.

12. In a system in accordance with claim 10, said circuit control means energizing alarm means in response to actuation of said selected temperature responsive switch means.

13. In a system in accordance with claim 12, said circuit control means comprising timing means for opening the ignition circuit of said vehicle after a predetermined time interval, actuation of said selected temperature responsive switch means initiating operation of said timing means.

14. In a system in accordance with claim 12, said circuit control means comprising first timing means for energizing second alarm means after a predetermined time interval, actuation of said selected temperature responsive switch means initiating operation of said timing means, second timing means for opening the ignition circuit of said vehicle after a second predetermined time interval, said first timing means initiating operation of said second timing means after completion of said first predetermined time interval.

15. In a system in accordance with claim 10, said circuit control means including timing means for opening said ignition circuit after a predetermined time interval, actuation of selective temperature responsive switch means initiating operation of said timing means.

16. In a system in accordance with claim 1, said temperature responsive switch means comprising a capillary tube, a column of mercury within said capillary tube, and electrodes at each end of said tube, said tube extending through said chemical means.

* * * * *